United States Patent
Haruna et al.

(10) Patent No.: US 11,045,898 B2
(45) Date of Patent: Jun. 29, 2021

(54) FRICTION STIR SPOT WELDING METHOD AND FRICTION STIR SPOT WELDING APPARATUS

(71) Applicant: KAWASAKI JUKOGYO KABUSHIKI KAISHA, Kobe (JP)

(72) Inventors: Shunsuke Haruna, Himeji (JP); Shintaro Fukada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 252 days.

(21) Appl. No.: 16/084,630

(22) PCT Filed: Mar. 13, 2017

(86) PCT No.: PCT/JP2017/010009
§ 371 (c)(1),
(2) Date: Sep. 13, 2018

(87) PCT Pub. No.: WO2017/159627
PCT Pub. Date: Sep. 21, 2017

(65) Prior Publication Data
US 2019/0070692 A1  Mar. 7, 2019

(30) Foreign Application Priority Data
Mar. 17, 2016  (JP) .............................. JP2016-053513

(51) Int. Cl.
*B23K 20/12*  (2006.01)
*B23K 20/22*  (2006.01)

(52) U.S. Cl.
CPC ........ *B23K 20/1255* (2013.01); *B23K 20/122* (2013.01); *B23K 20/123* (2013.01); *B23K 20/1265* (2013.01); *B23K 20/22* (2013.01)

(58) Field of Classification Search
None
See application file for complete search history.

(56) References Cited

U.S. PATENT DOCUMENTS 6,247,633 B1 *  6/2001  White ................. B23K 20/123
                                                          228/112.1
6,299,950 B1 * 10/2001  Byington ................. G21F 5/08
                                                          250/506.1

(Continued)

FOREIGN PATENT DOCUMENTS

JP   2012-196682 A   10/2012

OTHER PUBLICATIONS

Piccini et al., "Effect of tool penetration depth in FSSW", Procedia Materials Science, 2015, issue 8, p. 868-877, (Year: 2015).*

*Primary Examiner* — Devang R Patel
(74) *Attorney, Agent, or Firm* — Oliff PLC

(57) ABSTRACT

A friction stir spot welding method according to one aspect of the present invention includes: performing a plunging process of moving a shoulder (28) toward a second workpiece (102) from a first workpiece (101) side while rotating a rotary tool to plunge the shoulder into the first and second workpieces; and performing a backfilling process of pushing stirred materials that have flowed into an inside of the shoulder in the plunging process out of the shoulder and backfilling a plunging hole with the stirred materials, the plunging hole being formed by the plunging of the shoulder. In the plunging process, the shoulder is plunged to a position that is shifted from a boundary between the first workpiece and the second workpiece to the second workpiece side by 1 mm or more, such that a component of a protective layer (104) is concentrated in a central portion of a stirred portion (105) when the backfilling process is completed.

4 Claims, 5 Drawing Sheets

(56) References Cited

U.S. PATENT DOCUMENTS

| | | | |
|---|---|---|---|
| 9,095,926 B2 * | 8/2015 | Okada | B23K 20/1265 |
| 2002/0179682 A1 * | 12/2002 | Schilling | B23K 20/127 228/112.1 |
| 2008/0029581 A1 * | 2/2008 | Kumagai | B23K 20/1255 228/101 |
| 2014/0069985 A1 * | 3/2014 | Okada | B23K 20/1255 228/112.1 |
| 2014/0069986 A1 | 3/2014 | Okada et al. | |
| 2015/0231724 A1 | 8/2015 | Williams | |

* cited by examiner

FRICTION STIR SPOT WELDING METHOD AND FRICTION STIR SPOT WELDING APPARATUS

TECHNICAL FIELD

The present invention relates to a friction stir spot welding method and a friction stir spot welding apparatus.

BACKGROUND ART

Friction stir spot welding (FSSW) is expected to replace, for example, spot welding and rivet connection. In friction stir spot welding, a rotary tool is plunged into workpieces that are stacked together. At the time, frictional heat is generated, which softens part of the workpieces, and the softened part of the workpieces is stirred. Consequently, the workpieces are jointed together. Examples of the friction stir spot welding include single-acting friction stir spot welding and refill friction stir spot welding. In the single-acting friction stir spot welding, a rotary tool in which a shoulder and a pin are fixed is used. In the refill friction stir spot welding, a rotary tool in which a shoulder and a pin move relative to each other is used. In the refill friction stir spot welding, a backfilling process is performed after the plunging process. In the backfilling process, a hole formed as a result of plunging the rotary tool into the workpieces (i.e., a plunging hole) is backfilled with the stirred materials, and thereby a mark formed due to the joining can be made less noticeable (see Patent Literature 1).

CITATION LIST

Patent Literature

PTL 1: Japanese Laid-Open Patent Application Publication No. 2012-196682

SUMMARY OF INVENTION

Technical Problem

There are cases where the surface of a workpiece is subjected to surface treatment, such as anodizing treatment, or a protective layer made of a material that is different from the base material of the workpiece may be formed on the surface of the workpiece by primer coating. It has been found that in a case where workpieces having such a protective layer formed thereon are joined together by refill friction stir spot welding, the strength of the joint is lower than in a case where workpieces having no protective layer formed thereon are joined together by the same refill friction stir spot welding. The inventors of the present invention have further discovered that the lowering of the strength of the joint is caused by how the protective layer component is distributed in the refill friction stir spot welding.

The present invention has been made in view of the above. An object of the present invention is to provide a friction stir spot welding method that makes it possible to suppress the lowering of the strength of the joint when workpieces having a protective layer formed thereon are joined together by refill friction stir spot welding.

Solution to Problem

A friction stir spot welding method according to one aspect of the present invention is a refill friction stir spot welding method of joining a first workpiece and a second workpiece together by friction stir spot welding by using a rotary tool that includes a cylindrical shoulder and a columnar pin movable within the shoulder, the first workpiece and the second workpiece being such that a protective layer is formed on a joint surface of at least one of the first workpiece and the second workpiece. The friction stir spot welding method includes: performing a plunging process of moving the shoulder toward the second workpiece from the first workpiece side while rotating the rotary tool to plunge the shoulder into the first and second workpieces, such that a material of the first workpiece and a material of the second workpiece are partly stirred to form a stirred portion, and concurrently, a component of the protective layer flows into an inside of the shoulder together with other stirred materials; and performing a backfilling process of pushing the stirred materials that have flowed into the inside of the shoulder in the plunging process out of the shoulder by the pin while rotating the rotary tool, and concurrently, moving the shoulder backward to backfill a plunging hole with the stirred materials, the plunging hole being formed by the plunging of the shoulder. In the plunging process, the shoulder is plunged to a position that is shifted from a boundary between the first workpiece and the second workpiece to the second workpiece side by 1 mm or more, such that the component of the protective layer is concentrated in a central portion of the stirred portion when the backfilling process is completed.

In the plunging process, in which the stirred portion is formed, the component of the protective layer does not spread over the entire stirred portion, but a layer in which the density of the component of the protective layer is high, i.e., a layer (remaining layer) whose main component is the component of the protective layer, is formed within the stirred portion. In a conventional friction stir spot welding method, as a result of performing the backfilling process, the remaining layer is moved to a position close to the original position of the protective layer. In this case, when force is applied to the joint, a crack tends to occur in the remaining layer. The inventors of the present invention have found through experiments that this is the cause of the lowering of the joint strength. In this respect, according to the above-described method, in the backfilling process, the remaining layer can be concentrated in the central portion of the stirred portion. This makes it possible to prevent the formation of cracks in the remaining layer and suppress the lowering of the joint strength.

In the above friction stir spot welding method, a surface pressure of the shoulder against the stirred portion in the backfilling process may be set to be lower than the surface pressure of the shoulder against the stirred portion in the plunging process.

In a case where the shoulder is plunged to a certain plunging depth or more in the plunging process as described above, the flow of not only the materials in the stirred portion but also the materials around the stirred portion is facilitated. Accordingly, when the shoulder is pressed against the stirred portion in the backfilling process, a phenomenon occurs in which the portion around the stirred portion rises. In this respect, by setting the surface pressure of the shoulder against the stirred portion in the backfilling process to be low as described above, the occurrence of the phenomenon can be prevented.

In the backfilling process of the above friction stir spot welding method, the shoulder may be pressed against the stirred portion at a surface pressure of 90 to 175 MPa.

By thus setting the surface pressure of the shoulder against the stirred portion in the backfilling process to a relatively low value of 90 to 175 MPa, the rising of the portion around the stirred portion, which may occur when the shoulder is pressed against the stirred portion, can be suppressed.

A friction stir spot welding apparatus according to another aspect of the present invention is a friction stir spot welding apparatus for joining a first workpiece and a second workpiece by friction stir spot welding, the first workpiece and the second workpiece being such that a protective layer is formed on a joint surface of at least one of the first workpiece and the second workpiece. The friction stir spot welding apparatus includes: a rotary tool that includes a cylindrical shoulder and a columnar pin movable within the shoulder; and a controller configured to control the rotary tool. The controller: moves the shoulder toward the second workpiece from the first workpiece side while rotating the rotary tool to plunge the shoulder into the first and second workpieces, such that a material of the first workpiece and a material of the second workpiece are partly stirred to form a stirred portion, and concurrently, a component of the protective layer flows into an inside of the shoulder together with other stirred materials; and then causes the pin to push the stirred materials that have flowed into the inside of the shoulder in the plunging process out of the shoulder while rotating the rotary tool, and concurrently, moves the shoulder backward to backfill a plunging hole with the stirred materials, the plunging hole being formed by the plunging of the shoulder. When forming the stirred portion, the controller plunges the shoulder to a position that is shifted from a boundary between the first workpiece and the second workpiece to the second workpiece side by 1 mm or more.

Advantageous Effects of Invention

The above-described friction stir spot welding method makes it possible to suppress the lowering of the strength of the joint when workpieces having a protective layer formed thereon are joined together.

DESCRIPTION OF EMBODIMENTS

<Joining Apparatus>

Figure 1:
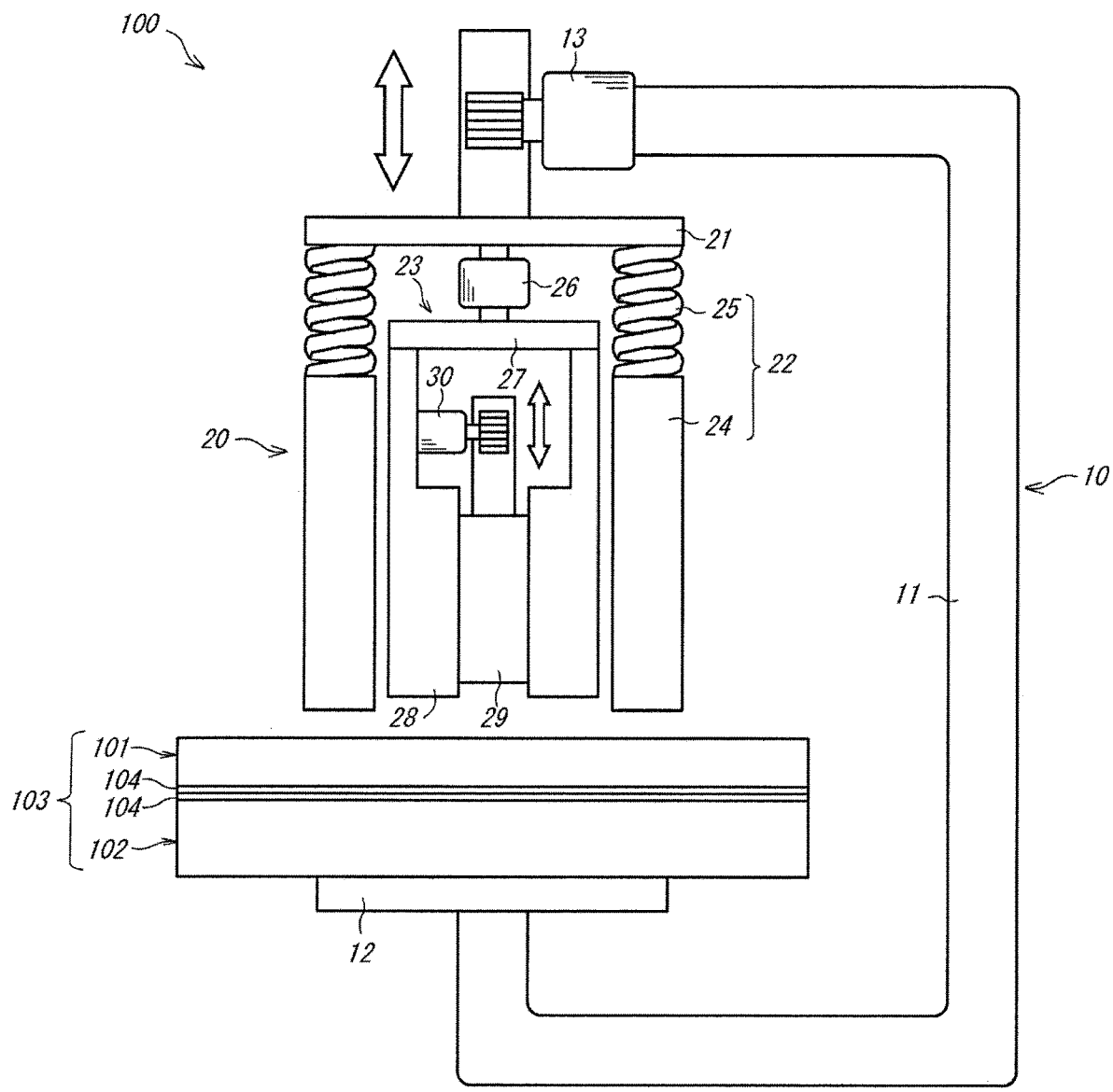
FIG. 1 is a general view of a friction stir spot welding apparatus.
Figure 2:
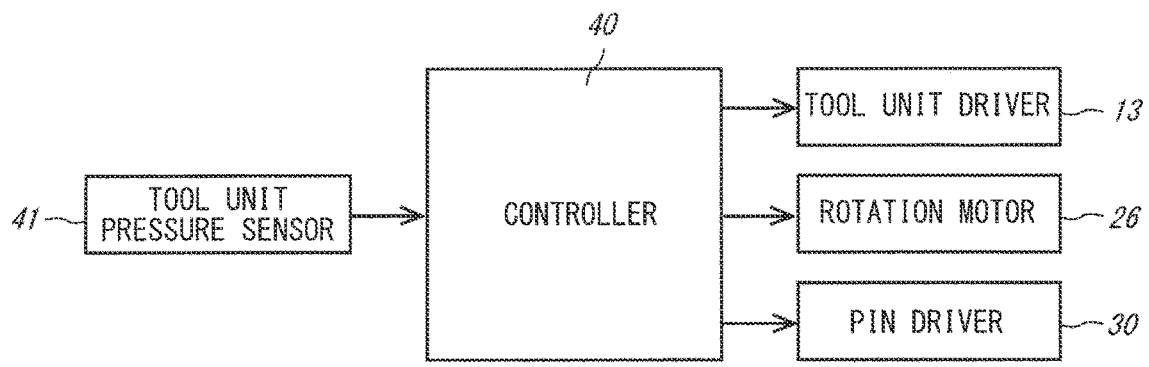
FIG. 2 is a block diagram of a control system of the friction stir spot welding apparatus.

First, a friction stir spot welding apparatus (which may hereinafter be simply referred to as "joining apparatus") 100 used in a friction stir spot welding method (which may hereinafter be simply referred to as "joining method") according to one embodiment of the present invention is described. FIG. 1 is a schematic diagram showing the joining apparatus 100. FIG. 2 is a block diagram of a control system of the joining apparatus 100. The joining apparatus 100 is an apparatus for joining a first workpiece 101 and a second workpiece 102 together (hereinafter, these workpieces 101 and 102 are collectively referred to as "workpiece 103") by friction stir spot welding. The joining apparatus 100 includes a body 10, a tool unit 20, and a controller 40.

The body 10 includes: a frame 11 formed in a C shape; backing 12 provided on one end portion of the frame 11 (in the lower part of FIG. 1) and supporting the workpiece 103; and a tool unit driver 13 provided on the other end portion of the frame 11 (in the upper part of FIG. 1) in a manner to face the backing 12.

The tool unit driver 13 is capable of causing the tool unit 20 to move in a direction toward the workpiece 103 (hereinafter, "move forward") and to move in a direction away from the workpiece 103 (hereinafter, "move backward"). The tool unit driver 13 is provided with a tool unit pressure sensor 41 (see FIG. 2). The tool unit driver 13 of the present embodiment is configured as a rack-and-pinion mechanism. However, as an alternative, the tool unit driver 13 may be configured as, for example, a ball screw mechanism or a hydraulic actuator mechanism.

The tool unit 20 includes: a tool holder 21 connected to the tool unit driver 13 of the body 10; a clamp 22 held by the tool holder 21; and a rotary tool 23 held by the tool holder 21 and positioned inward of the clamp 22.

The clamp 22 includes a cylindrical pressing member 24 and an urging portion 25 configured to urge the pressing member 24 toward the workpiece 103. The urging portion 25 of the present embodiment is configured as a spring coil. However, as an alternative, the urging portion 25 may be configured as, for example, a rack-and-pinion mechanism, a ball screw mechanism, or a hydraulic actuator mechanism.

The rotary tool 23 is mounted to the tool holder 21 via a rotation motor 26. Accordingly, the rotary tool 23 rotates relative to the tool holder 21 and the workpiece 103. The rotary tool 23 includes: a shoulder holder 27 connected to the rotation motor 26; a shoulder 28 held by the shoulder holder 27; and a pin 29 positioned within the shoulder 28.

The shoulder 28 is positioned inward of the pressing member 24, and has a cylindrical shape. The central axis of the shoulder 28 coincides with the rotational axis of the rotary tool 23. When performing friction stir spot welding, the shoulder 28 is plunged into the workpiece 103 while rotating.

The pin 29 has a columnar shape. The central axis of the pin 29 coincides with the rotational axis of the rotary tool 23 and the central axis of the shoulder 28. The pin 29 is connected to the shoulder 28 via a pin driver 30. The pin driver 30 is capable of causing the pin 29 to move within the shoulder 28 in the axial direction. It should be noted that the position of the pin 29 relative to the workpiece 103 in the axial direction is determined by the moving amount of the tool unit 20 and the moving amount of the pin 29 relative to the shoulder 28. The pin 29 rotates together with the shoulder 28.

The controller 40 includes a CPU, ROM, RAM, etc. The controller 40 controls the entire joining apparatus 100 including the rotary tool 23.

As shown in FIG. 2, the controller 40 is electrically connected to the tool unit pressure sensor 41, and is capable of obtaining the pressing pressure of the tool unit 20 when the tool unit 20 is pressed against the workpiece 103 (hereinafter, "tool unit pressing pressure") based on a measurement signal transmitted from the tool unit pressure sensor 41. It should be noted that, based on the obtained tool unit pressing pressure and the urging force of the clamp 22 (the urging force is calculated from the moving amount of the tool unit 20), the pressing pressure of the shoulder 28 when the shoulder 28 is pressed against the workpiece 103 (hereinafter, "shoulder pressing pressure") can be calculated. The shoulder pressing pressure may be calculated by an external device (e.g., external PC) provided separately from the joining apparatus 100, or may be calculated by the controller 40.

The controller 40 is electrically connected to the tool unit driver 13, the rotation motor 26, and the pin driver 30, and transmits control signals to these devices. By transmitting the control signals to these devices, the controller 40 can move the tool unit 20 by an intended moving amount and at an intended moving speed, rotate the rotary tool 23 at an intended rotational speed (hereinafter, "tool rotational speed"), and move the pin 29 relative to the shoulder 28 by an intended moving amount and at an intended moving speed. It should be noted that the moving amount and the moving speed of the shoulder 28 are equal to the moving amount and the moving speed of the tool unit 20.

The joining apparatus 100 is as described above. In the above-described joining apparatus 100, the clamp 22, the shoulder 28, and the pin 29 are configured to move forward and backward integrally, and the shoulder 28 and the pin 29 are configured to rotate integrally. However, the clamp 22, the shoulder 28, and the pin 29 may be configured to move or rotate independently of each other. Although FIG. 1 shows the first workpiece 101 and the second workpiece 102 as flat plate-shaped members, the first workpiece 101 and the second workpiece 102 are not limited to flat plate-shaped members.

<Conventional Joining Method>

Figure 3:
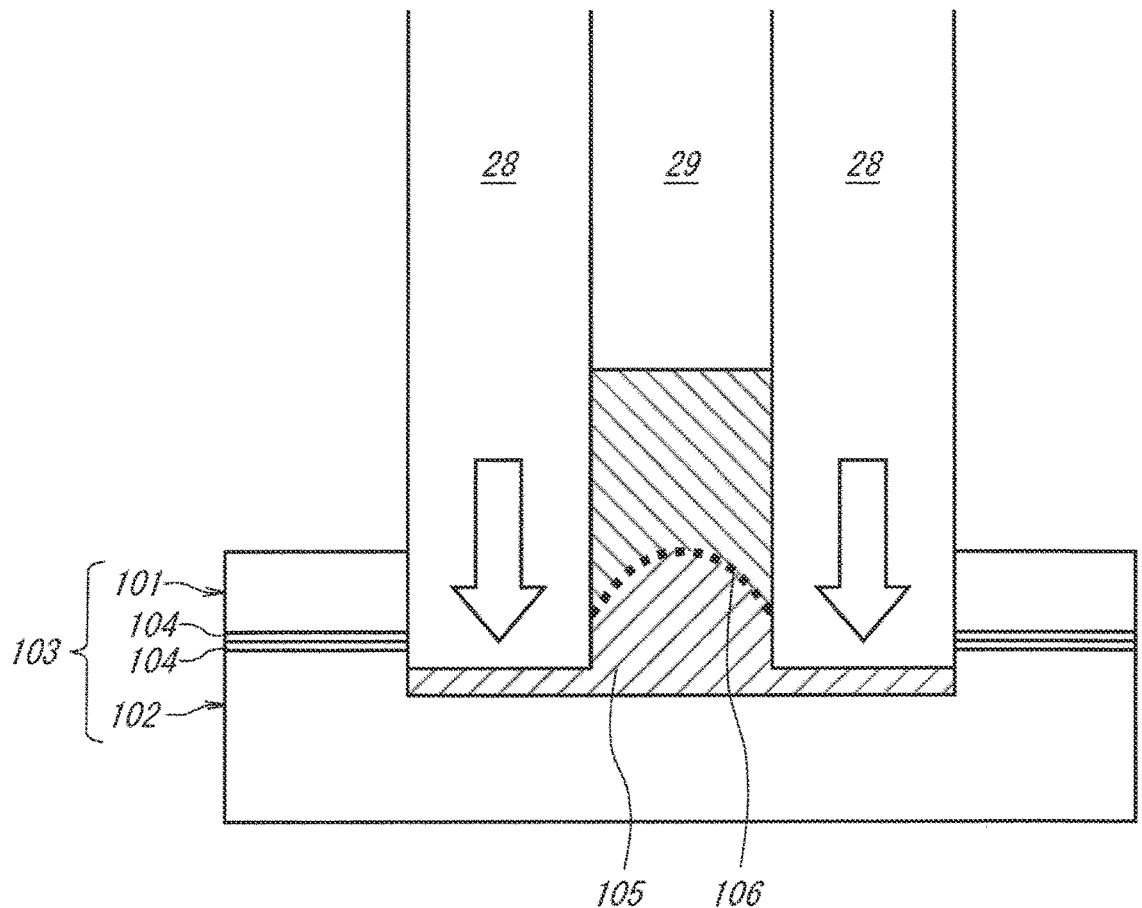
FIG. 3 is a conceptual diagram showing a plunging process in a conventional friction stir spot welding method.
Figure 4:
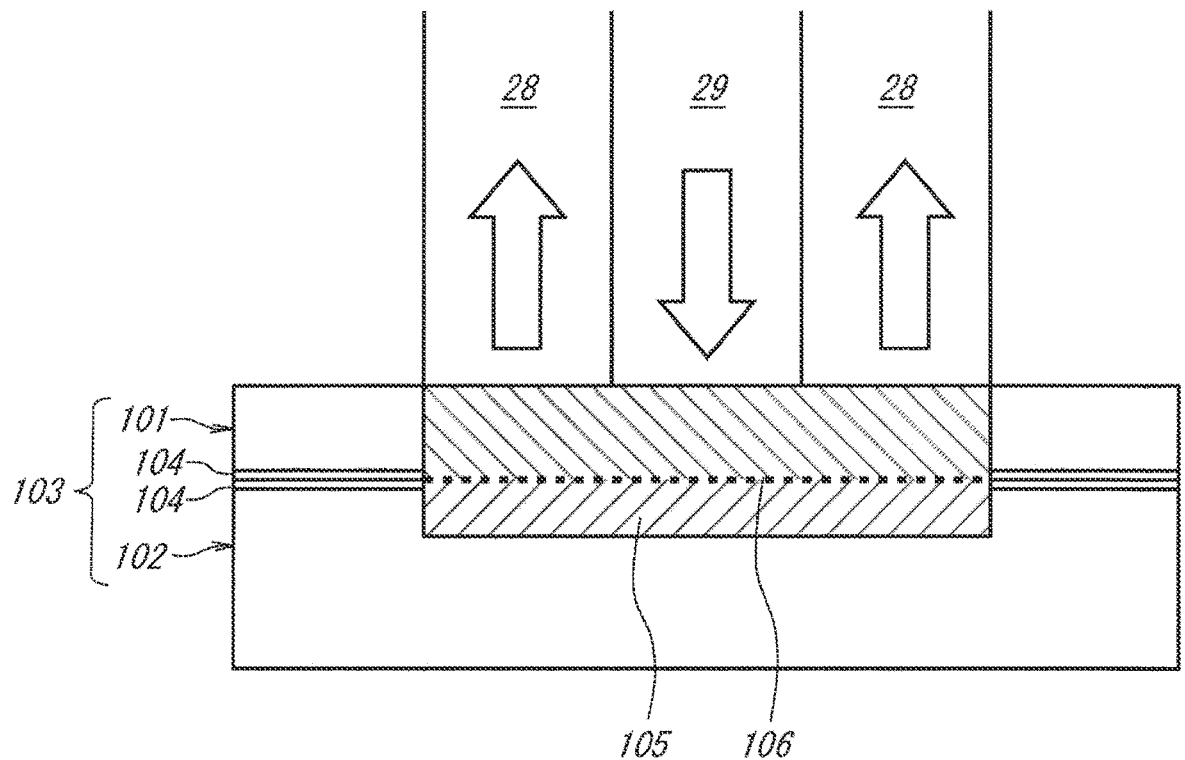
FIG. 4 is a conceptual diagram showing a backfilling process in the conventional friction stir spot welding method.

Next, before describing a joining method according to the present embodiment, a conventional joining method is described. FIG. 3 and FIG. 4 are conceptual diagrams showing a conventional joining method. FIG. 3 and FIG. 4 show only the shoulder 28, the pin 29, the first workpiece 101, and the second workpiece 102, which are essential components (similarly, FIG. 5 and FIG. 6 also show only these essential components).

The first workpiece 101 and the second workpiece 102, which are to be joined together, are made of an aluminum alloy. A protective layer 104 is formed on a surface (joint surface) of the first workpiece 101, the surface contacting the second workpiece 102. The protective layer 104 is formed also on a surface (joint surface) of the second workpiece 102, the surface contacting the first workpiece 101. It should be noted that examples of the protective layer 104 include an anodized layer, a coated layer, a clad layer, and a sealing layer.

The conventional joining method includes a plunging process (see FIG. 3) and a backfilling process (see FIG. 4). Each process is performed as a result of the controller 40 controlling the operation of the rotary tool 23 by transmitting control signals to the tool unit driver 13, the rotation motor 26, and the pin driver 30.

In the plunging process, the shoulder 28 is plunged into the workpiece 103. Specifically, as shown in FIG. 3, while rotating the rotary tool 23, the shoulder 28 is moved forward toward the second workpiece 102 from the first workpiece 101 side. At the time, the pin 29 is kept moved backward. It should be noted that the shoulder 28 is plunged to a position that is shifted from the boundary between the first workpiece 101 and the second workpiece 102 to the second workpiece 102 side by 0.1 to 0.3 mm.

As a result of performing the plunging process, the material of the first workpiece 101 and the material of the second workpiece 102 are partly softened by frictional heat, and the softened materials are stirred by the rotation of the shoulder 28. Consequently, a stirred portion 105 (a shaded portion in the drawing) is formed, which is made of the materials stirred by the shoulder 28 (stirred materials). At the time, the base material component of the first workpiece 101, the base material component of the second workpiece 102, and the components of the protective layers 104 flow into the inside of the shoulder 28.

In the plunging process, the components of the protective layers 104 do not spread over the entire stirred portion 105, but flow in a relatively non-spreading manner. For this reason, as shown in FIG. 3, a layer in which the density of the components of the protective layers 104 is high, i.e., a layer whose main components are the components of the protective layers 104 (hereinafter, "remaining layer 106"), is formed. As a result of performing the plunging process, the remaining layer 106 flows into the inside of the shoulder 28.

It should be noted that, in the above plunging process, since the shoulder 28 is plunged into the workpiece 103, if the shoulder 28 is simply moved backward and the stirred portion 105 is cooled down and solidified, a plunging hole will be formed in the portion previously plunged by the shoulder 28. For this reason, in order to prevent the formation of the plunging hole in the stirred portion 105, a backfilling process described below is performed following the plunging process.

In the backfilling process, the pin 29 is moved forward relative to the shoulder 28 while rotating the rotary tool 23. As a result, the stirred materials that have flowed into the inside of the shoulder 28 are pushed out of the shoulder 28 by the pin 29. Then, the stirred materials that have been pushed out from the inside of the shoulder 28 apply force to the end surface of the shoulder 28 at the forward moving direction side (i.e., to the lower surface of the shoulder 28 in FIG. 3), causing the shoulder 28 to move backward, and thereby the stirred materials flow into the portion previously plunged by the shoulder 28 (i.e., into the plunging hole). The operation thus described is continued until the position of the surface of the pin 29, the surface contacting the workpiece 103, and the position of the surface of the shoulder 28, the surface contacting the workpiece 103, coincide with each other in the axial direction. In this manner, the plunging hole is backfilled with the stirred materials, and thereby the surface of the first workpiece 101 is flattened.

In the backfilling process, the shoulder 28 moves backward as a result of the shoulder 28 being pushed back and lifted by the stirred materials. Thus, the shoulder 28 moves backward while the shoulder 28 is pressing the workpiece 103. That is, the shoulder 28 moves in a direction indicated by outlined arrows in FIG. 4, and also, the shoulder 28 presses the workpiece 103 (stirred portion 105) in a direction reverse to the moving direction. At the time, the pressing pressure of the shoulder 28 (shoulder pressing pressure) is about 200 MPa.

When the backfilling process is completed, the material of the first workpiece 101 and the material of the second workpiece 102, which have been partly stirred in the stirred portion 105, are cooled down and solidified, and thereby a columnar joint is formed. In this manner, the first workpiece 101 and the second workpiece 102 are joined together.

Here, as shown in FIG. 4, in the conventional joining method, when the plunging hole is backfilled with the stirred materials in the backfilling process, the remaining layer 106 is pushed back to a position close to the original position of the protective layers 104. Accordingly, when the joining of the first workpiece 101 and the second workpiece 102 is completed, the outer peripheral portion of the remaining layer 106 reaches the outer peripheral surface of the joint (i.e., the outer peripheral surface of the stirred portion 105) or the vicinity thereof, and the position of the outer peripheral portion of the remaining layer 106 in the axial direction is close to the position of the boundary between the first workpiece 101 and the second workpiece 102 in the axial direction. In this case, when force is applied to the joint, a crack tends to occur in the outer peripheral portion of the remaining layer 106. For this reason, in a case where workpieces having a protective layer formed thereon are joined together, the strength of the joint is lower than in a case where workpieces having no protective layer formed thereon are joined together.

Joining Method According to Embodiment

Figure 5:
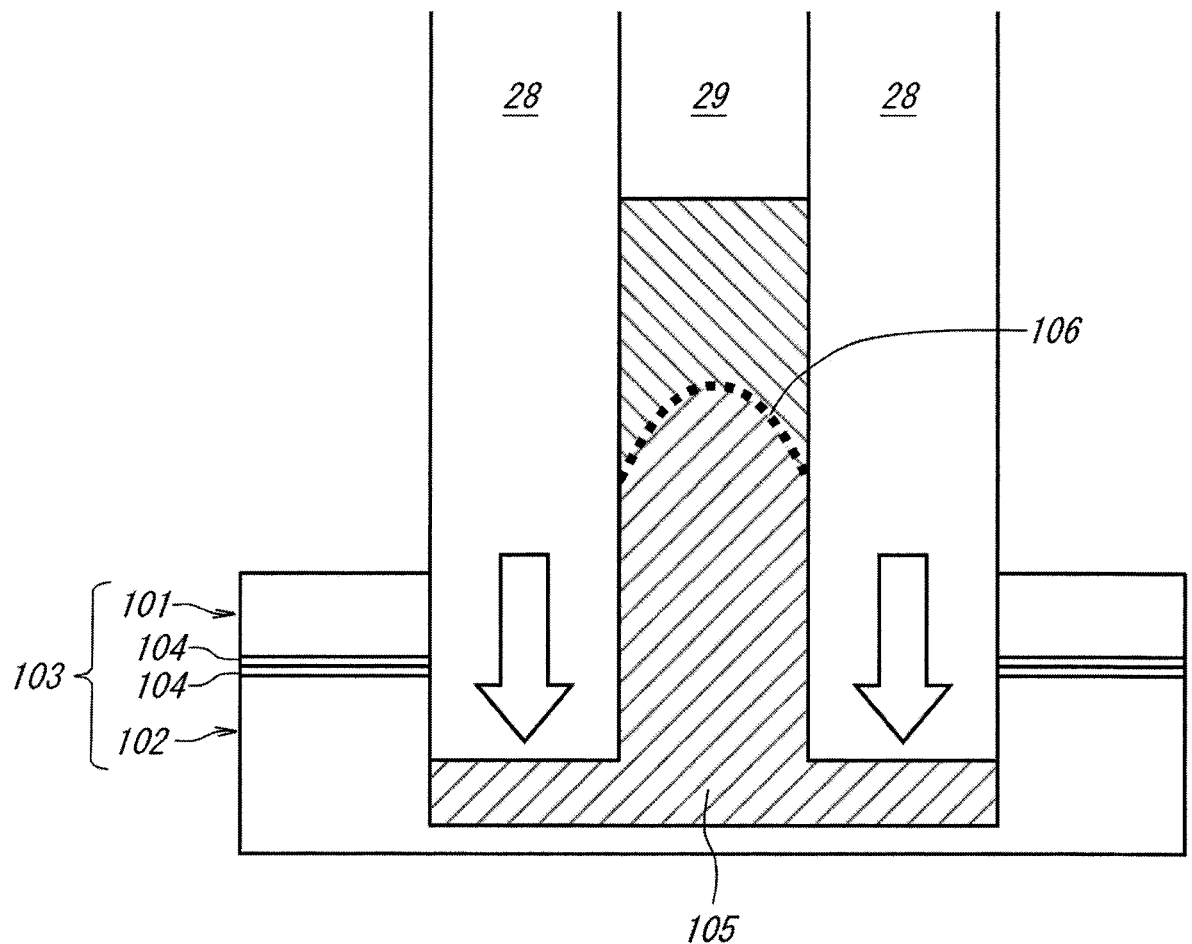
FIG. 5 is a conceptual diagram showing a plunging process in a friction stir spot welding method according to one embodiment.
Figure 6:
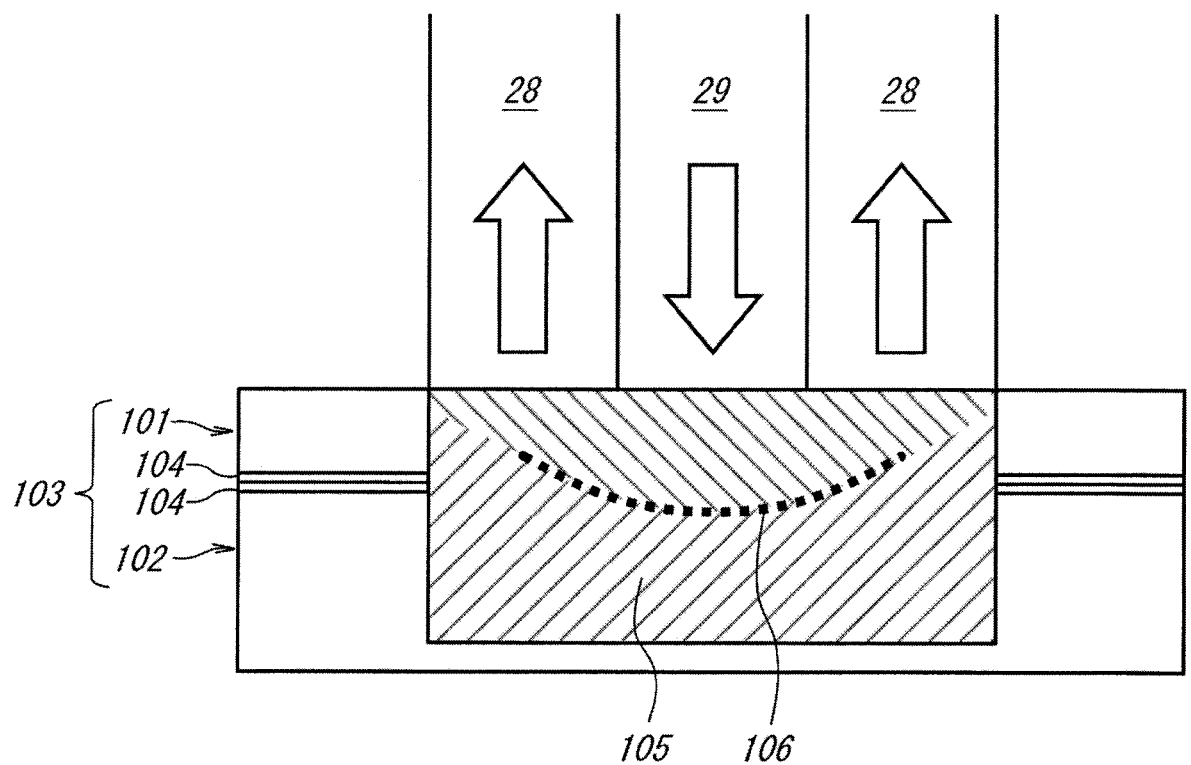
FIG. 6 is a conceptual diagram showing a backfilling process in the friction stir spot welding method according to the embodiment.

Next, a joining method according to the present embodiment is described. FIG. 5 and FIG. 6 show the joining method according to the present embodiment. It is assumed herein that the protective layer 104 is formed on the joint surface of each of the first workpiece 101 and the second workpiece 102.

Similar to the conventional joining method, the joining method according to the present embodiment includes a plunging process (see FIG. 5) and a backfilling process (see FIG. 6). Each process is performed as a result of the controller 40 controlling the rotary tool 23 by transmitting control signals to the tool unit driver 13, the rotation motor 26, and the pin driver 30.

In the plunging process of the present embodiment, similar to the conventional plunging process, while rotating the rotary tool 23, the shoulder 28 is moved forward toward the second workpiece 102 from the first workpiece 101 side to plunge the shoulder 28 into the workpiece 103. However, as shown in FIG. 5, the plunging depth of the shoulder 28 into the workpiece 103 in the present embodiment is greater than the plunging depth in the conventional joining method (see FIG. 3). Specifically, in the present embodiment, the shoulder 28 is plunged to a position that is shifted from the boundary between the first workpiece 101 and the second workpiece 102 to the second workpiece 102 side by 1 mm or more.

In a case where the plunging depth of the shoulder 28 is thus great, the stirred portion 105 expands to the second workpiece 102 side compared to a case where the plunging depth is small. For this reason, among the stirred materials flowing into the inside of the shoulder 28, the amount of the base material component of the first workpiece 101 and the amount of the components of the protective layers 104 are substantially the same as those in the conventional plunging process, but the amount of the base material component of the second workpiece 102 is significantly greater than that in the conventional plunging process.

It should be noted that if the plunging of the shoulder 28 in the plunging process is stopped near the boundary between the first workpiece 101 and the second workpiece 102, the stirred material of the first workpiece 101 is merely pushed into the second workpiece 102 side, and the first workpiece 101 and the second workpiece 102 are not mixed together sufficiently. This tendency is noticeable particularly in a case where impurities such as the protective layers 104 are present at the boundary between the first workpiece 101 and the second workpiece 102.

Next, in the backfilling process of the present embodiment, similar to the conventional backfilling process, while rotating the rotary tool 23, the stirred materials that have flowed into the inside of the shoulder 28 are pushed out of the shoulder 28 by the pin 29, and thereby the shoulder 28 is moved backward.

As previously described, in the plunging process of the joining method according to the present embodiment, the amount of the base material component of the second workpiece flowing into the inside of the shoulder 28 is greater than in the conventional plunging process. For this reason, in the backfilling process, in accordance with the backward movement of the shoulder 28, a large amount of the base material component of the second workpiece flows into the portion previously plunged by the shoulder 28 (i.e., into the plunging hole). Consequently, as shown in FIG. 6, when the backfilling process is completed, the base material component of the first workpiece 101 or the second workpiece 102 spreads near the outer peripheral surface of the stirred portion 105 (i.e., the outer peripheral surface of the joint), and the remaining layer 106 is enclosed within the stirred portion 105. That is, the components of the protective layers 104 are concentrated in the central portion of the stirred portion 105. In other words, near the central axis of the stirred portion 105, the proportion of the components of the protective layers 104 to the stirred materials is higher than in the outer peripheral portion of the stirred portion 105.

Therefore, the components of the protective layers 104 hardly reach the outer peripheral portion of the stirred portion 105. The position of the outer peripheral portion of the remaining layer 106 in the axial direction is also away from the position of the boundary between the first workpiece 101 and the second workpiece 102 in the axial direction. Consequently, the joint formed by the joining method according to the present embodiment has higher strength than the joint formed by the conventional joining method.

It should be noted that large part of the base material of the second workpiece 102 directly contacts the shoulder 28, and the base material of the second workpiece 102 has relatively high fluidity. For this reason, by quickly moving the shoulder 28 backward in the backfilling process, the base material component of the second workpiece 102 can be caused to preferentially flow into the space that is formed when the shoulder 28 moves backward (i.e., into the plunging hole), and thereby the remaining layer 106 can be covered with the base material of the second workpiece 102.

In the present embodiment, the plunging depth of the shoulder 28 is great, and a large amount of heat is generated by the friction. This facilitates the flow of the materials, and allows the materials to flow in a more spreading manner. Therefore, in the backfilling process, if the shoulder pressing pressure is set to be substantially the same as the shoulder pressing pressure in the conventional joining method, the portion outward of the portion directly pressed by the shoulder 28 rises against the urging force of the clamp 22. As a result, a large step is formed between the joint and the portion around the joint.

In view of the above, the shoulder pressing pressure in the backfilling process in the present embodiment is set to be lower than in the conventional joining method. For example, in the present embodiment, the surface pressure of the shoulder 28 (shoulder pressing pressure) against the stirred portion 105 in the backfilling process is set to be lower than the surface pressure of the shoulder 28 (shoulder pressing pressure) against the stirred portion 105 in the plunging process. More specifically, the shoulder 28 is pressed against the stirred portion 105 with a surface pressure of 90 to 175 MPa. This makes it possible to reduce or eliminate the step that may be formed between the joint and the portion around the joint in the backfilling process.

It should be noted that the portion that may rise in the backfilling process is the portion positioned radially outward of the stirred portion 105, i.e., the portion corresponding to the clamp 22. Therefore, it is conceivable to suppress the rising by setting the pressing pressure of the clamp 22 high. In this case, however, a mechanism for driving the clamp 22 needs to be installed separately, which may cause the joining apparatus 100 to increase in size and become complex. Therefore, the above-described method, in which the shoulder pressing pressure in the backfilling process is set to be low, is effective also in terms of being able to avoid the problem of causing the joining apparatus 100 to increase in size and become complex.

The joining method according to the present embodiment is as described above. Although the above description of the joining method describes only the plunging process and the backfilling process, the joining method may include other processes in addition to the plunging process and the backfilling process. For example, the joining method may include a process that is performed before the plunging process. In the process, the shoulder 28 and the pin 29 that are rotating may be brought into contact with the surface of the first workpiece 101 to heat the surface.

REFERENCE SIGNS LIST 23 rotary tool
28 shoulder
29 pin
40 controller
100 friction stir spot welding apparatus
101 first workpiece
102 second workpiece
104 protective layer
105 stirred portion

The invention claimed is:

1. A friction stir spot welding method that is a refill friction stir spot welding method of joining a first workpiece and a second workpiece together by friction stir spot welding by using a rotary tool that includes a cylindrical shoulder and a columnar pin movable within the shoulder, the first workpiece and the second workpiece being such that a protective layer is formed on a joint surface of at least one of the first workpiece and the second workpiece, the friction stir spot welding method comprising:

performing a plunging process of moving the shoulder toward the second workpiece from the first workpiece side while rotating the rotary tool to plunge the shoulder into the first and second workpieces, such that a material of the first workpiece and a material of the second workpiece are partly stirred to form a stirred portion, and concurrently, a component of the protective layer flows into an inside of the shoulder together with other stirred materials; and performing a backfilling process of pushing the stirred materials that have flowed into the inside of the shoulder in the plunging process out of the shoulder by the pin while rotating the rotary tool, and concurrently, moving the shoulder backward to backfill a plunging hole with the stirred materials, the plunging hole being formed by the plunging of the shoulder, wherein in the plunging process, the shoulder is plunged to a position that is beyond a boundary between the first workpiece and the second workpiece to the second workpiece side by 1 mm or more resulting in in a proportion of the component of the protective layer being higher in a central portion of the stirred portion than an outer peripheral portion of the stirred portion after the backfilling process is completed.

2. The friction stir spot welding method according to claim 1, wherein a surface pressure of the shoulder against the stirred portion in the backfilling process is set to be lower than the surface pressure of the shoulder against the stirred portion in the plunging process.

3. The friction stir spot welding method according to claim 1, wherein in the backfilling process, the shoulder is pressed against the stirred portion at a surface pressure of 90 to 175 MPa.

4. A friction stir spot welding apparatus for joining a first workpiece and a second workpiece by friction stir spot welding, the first workpiece and the second workpiece being such that a protective layer is formed on a joint surface of at least one of the first workpiece and the second workpiece, the friction stir spot welding apparatus comprising:

a rotary tool that includes a cylindrical shoulder and a columnar pin movable within the shoulder; and a controller configured to control the rotary tool, wherein the controller:

moves the shoulder toward the second workpiece from the first workpiece side while rotating the rotary tool to plunge the shoulder into the first and second workpieces, such that a material of the first workpiece and a material of the second workpiece are partly stirred to form a stirred portion, and concurrently, a component of the protective layer flows into an inside of the shoulder together with other stirred materials; and then causes the pin to push the stirred materials that have flowed into the inside of the shoulder out of the shoulder while rotating the rotary tool, and concurrently, moves the shoulder backward to backfill a plunging hole with the stirred materials, the plunging hole being formed by the plunging of the shoulder, and when forming the stirred portion, the controller plunges the shoulder to a position that is beyond a boundary between the first workpiece and the second workpiece to the second workpiece side by 1 mm or more resulting in a proportion of the component of the protective layer being higher in a central portion of the stirred portion than an outer peripheral portion of the stirred portion after the plunging hole is backfilled with the stirred materials.

* * * * *